(12) United States Patent
Jin et al.

(10) Patent No.: US 9,869,783 B2
(45) Date of Patent: *Jan. 16, 2018

(54) STRUCTURE TENSOR CONSTRAINED TOMOGRAPHIC VELOCITY ANALYSIS

(71) Applicant: LANDMARK GRAPHICS CORPORATION, Houston, TX (US)

(72) Inventors: Shengwen Jin, Sugar Land, TX (US); Shiyong Xu, Sugar Land, TX (US); Fan Xia, Katy, TX (US); Richard Ottolini, Denver, CO (US); Yiqing Ren, Sugar Land, TX (US)

(73) Assignee: Landmark Graphics Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/025,659

(22) PCT Filed: Sep. 8, 2015

(86) PCT No.: PCT/US2015/048905
§ 371 (c)(1),
(2) Date: Mar. 30, 2016

(87) PCT Pub. No.: WO2016/064483
PCT Pub. Date: Apr. 28, 2016

(65) Prior Publication Data
US 2016/0299243 A1    Oct. 13, 2016

Related U.S. Application Data

(60) Provisional application No. 62/068,161, filed on Oct. 24, 2014.

(51) Int. Cl.
*G01V 1/30* (2006.01)
*G01V 1/38* (2006.01)

(52) U.S. Cl.
CPC .............. *G01V 1/303* (2013.01); *G01V 1/38* (2013.01)

(58) Field of Classification Search
None
See application file for complete search history.

(56) References Cited

U.S. PATENT DOCUMENTS

| 5,157,637 A | 10/1992 | Wang | |
|---|---|---|---|
| 8,406,081 B2* | 3/2013 | Xia | G01V 1/303 367/73 |

(Continued)

OTHER PUBLICATIONS

Wie Liu, 3D migration velocity analysis for common image gathers in the reflection angle domain, Alexander M. Popovici, Dimitri Bevc, 3DGeo Development Inc.; Biondo Biondi, Stanford University, SEG/San Antonio 2001, 4 pages.*

(Continued)

*Primary Examiner* — Tung Lau
(74) *Attorney, Agent, or Firm* — Tenley Krueger; Baker Botts L.L.P.

(57) ABSTRACT

An example method for tomographic migration velocity analysis may include collecting seismographic traces from a subterranean formation and using an initial velocity model to generate common image gathers and a depth image volume based, at least in part, on the seismographic traces. A structure tensor may be computed with the depth image volume for automated structural dip and azimuth estimation. A semblance may be generated using said plurality of common image gathers and said structure tensor. Image depth residuals may be automatically picked from said semblance. A ray tracing computation may be performed on said initial velocity models using said structure tensor. An updated velocity model may be generated with a tomographic inversion computation, wherein said tomographic (Continued)

inversion computation uses said plurality of image depth residuals and said ray tracing computation.

9 Claims, 12 Drawing Sheets

(56) References Cited

U.S. PATENT DOCUMENTS

| | | | |
|---|---|---|---|
| 8,830,788 B2* | 9/2014 | Xia | G01V 1/303 367/50 |
| 2002/0049540 A1 | 4/2002 | Bevc et al. | |
| 2009/0010102 A1 | 1/2009 | Broto et al. | |
| 2011/0075516 A1 | 3/2011 | Xia et al. | |
| 2014/0200814 A1 | 7/2014 | Guillaume et al. | |

OTHER PUBLICATIONS

Alexander M. Popovi, 3-D Seismic Imaging for the 21st Century: Common Azimuth Wave-Equation Migration and MVA, EAGE 64th Conference & Exhibition—Florence, Italy, May 27-30, 2002, 4 pages.*

Li Lu, Seismic Depth Imaging in Anisotropic Media East Coast of Canada Case Study, Calgary, Alberta Mar. 2014, 128 pages.*

International Search Report and Written Opinion issued in related PCT Application No. PCT/US2015/048905, dated Nov. 6, 2015 (10 pages).

Bevc et al., 2006, Automating the velocity building process: 68th Conference and Exhibition, EAGE, Extended Abstracts, p. 153.

Červený, V., 2001, Seismic ray theory: Cambridge University Press.

Fehmers et al., 2003, Fast structural interpretation with structure-oriented filtering: Geophysics, 68, No. 4, 1286-1293.

Hale, D., 2009, Structure-oriented smoothing and semblance: Center for Wave Phenomena Report CWP-635, 261-270.

Hale, D., 2013, Structure-oriented processing and inversion: http://cwp.mines.edu/PRM2013/Presentations/Mon_cwptutorial_part1.pdf.

Harlan et al., 1991, Traveltime tomography with multioffset common-reflection points: 61st Annual International Meeting, SEG, Expanded Abstracts, 974-976.

Toldi, J., 1989, Velocity analysis without picking, Geophysics, 54, No. 2, 191-199.

Xia et al., 2013, Angle-domain wave equation tomography using RTM image gathers: 83rd Annual International Meeting, SEG, Expanded Abstracts, 4822-4826, doi: 10.1190/segam2013-0400.1.

International Preliminary Report on Patentability issued in related Application No. PCT/US2015/048905, dated May 4, 2017 (7 pages).

* cited by examiner

FIGS. 10a-e

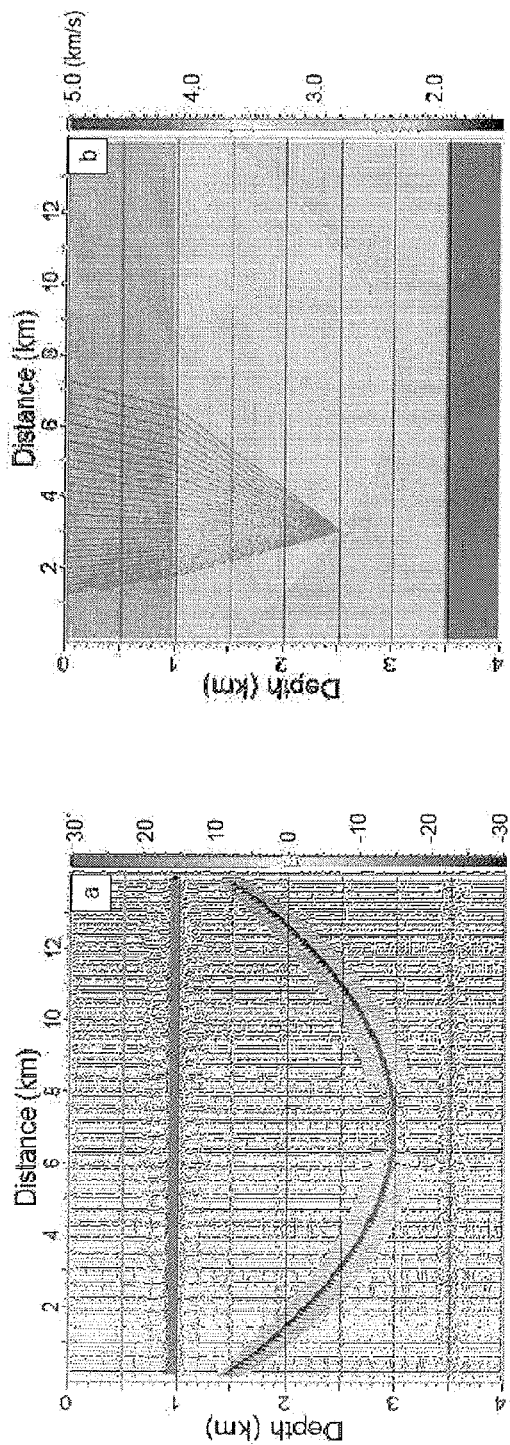
FIGS. 12a-b

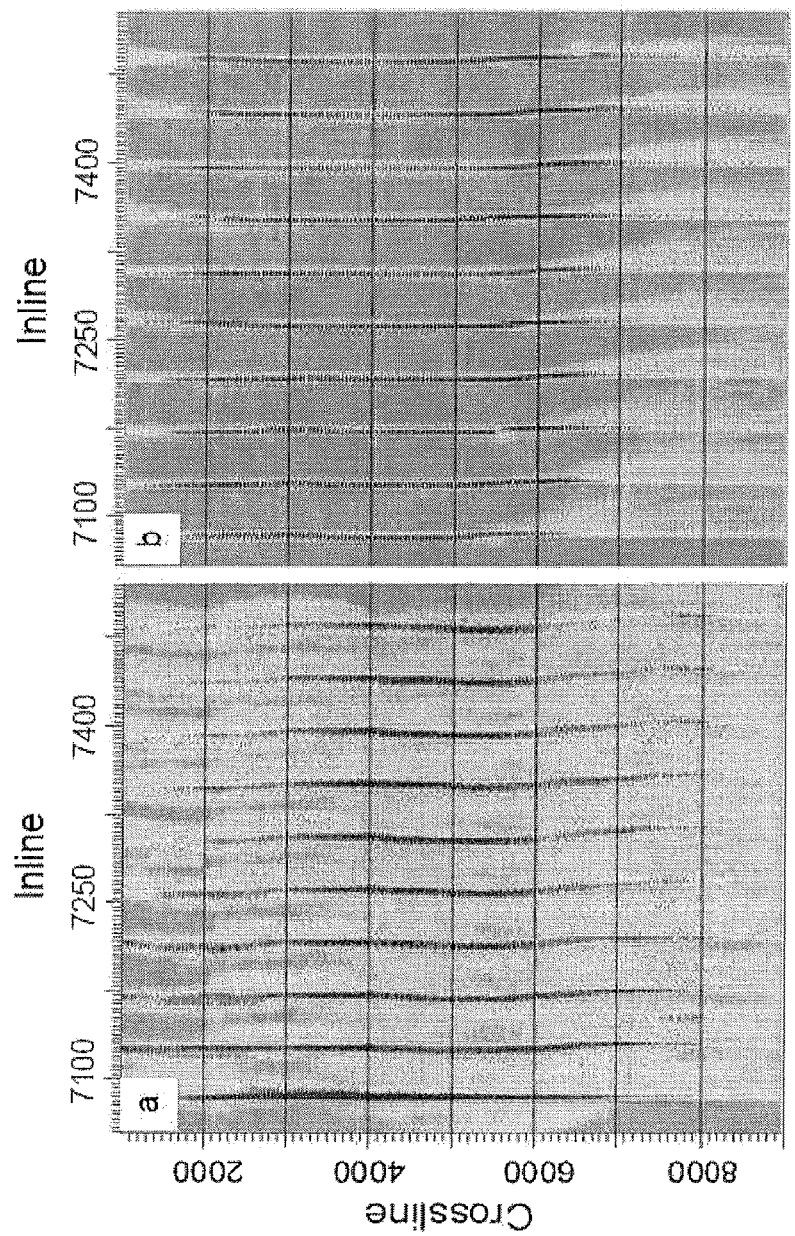
FIGS. 14a-b

STRUCTURE TENSOR CONSTRAINED TOMOGRAPHIC VELOCITY ANALYSIS

CROSS REFERENCE TO RELATED APPLICATION

This application is a U.S. National Stage Application of International Application No. PCT/US2015/048905 filed Sept. 8, 2015, which claims the benefit of U.S. Provisional Application No. 62/068,161, entitled "STRUCTURE TENSOR CONSTRAINED TOMOGRAPHIC VELOCITY ANALYSIS" and filed Oct. 24, 2014, both of which are incorporated herein by reference for all purposes.

BACKGROUND

The present disclosure relates generally to seismic exploration and specifically to structure tensor constrained tomographic velocity analysis.

Seismology is used for exploration, archaeological studies, and engineering projects that require geological information. Exploration seismology provides data that, when used in conjunction with other available geophysical, borehole, and geological data, can provide information about the structure and distribution of rock types and their contents. Such information greatly aids searches for water, geothermal reservoirs, and mineral deposits such as hydrocarbons and ores. Most oil companies rely on exploration seismology to select sites in which to drill exploratory oil wells.

Traditional seismology employs artificially generated seismic waves to map subsurface structures. The seismic waves propagate from a source down into the earth and reflect from boundaries between subsurface structures. Surface receivers detect and record reflected seismic waves for later analysis. Though some large-scale structures can often be perceived from a direct examination of the recorded signals, the recorded signals are typically processed using a subsurface velocity model to remove distortion and reveal finer detail in the subsurface image. The quality of the subsurface image may depend on the accuracy of the subsurface velocity model.

Velocity analysis may include extracting velocity information from seismic data. One process for velocity analysis includes an advanced prestack depth migration technique, which has become an attractive tool for velocity analysis, not only because of its sensitivity to the velocity model but also its ability to generate residual errors in the post-migration domain. A popular approach to the migration-velocity analysis (MVA) is the residual-curvature analysis on a common image point gather, which is based on residual moveout to measure velocity error. Residual-curvature analysis in areas of complex structure is a coupled migration-inversion problem that can be analyzed from a tomographic perspective.

Existing tomographic MVA processing methods require the step of picking, including (1) horizon picking in the depth image volume for the estimation of local dip and azimuth information and (2) residual moveout picking in the depth-migrated common image gathers for the measurement of depth residual information. Manual picking may be tedious and time-consuming, particularly in iterative processing and interpretation techniques.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

FIGS. 12a-b are diagrams illustrating an exemplary inline dip angle overlaid on a reverse-time migrated image and exemplary ray paths overlaid on a velocity model, respectively according to aspects of the present disclosure.

FIGS. 14a-b are diagrams illustrating a comparison of ray density coverage in a depth slice on the surface from an exemplary SEAM dataset, according to aspects of the present disclosure.

Figure 1:
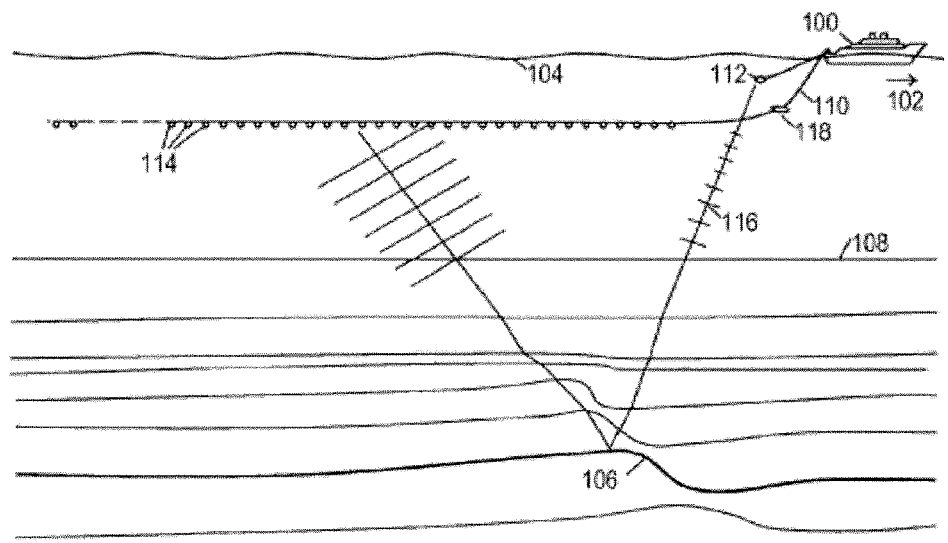
FIG. 1 is a diagram illustrating a side view of an illustrative marine seismic survey environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation.

Some or all of the aspects of the present disclosure may be implemented in an information handling system or computing system, both of which may be used interchangeably herein. Example information handling systems include server systems, computer terminals, handheld computing devices, tablets, smartphones, etc. For purposes of this disclosure, an information handling system or computing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As described herein, a three-dimensional (3D) automatic grid-based tomographic migration velocity analysis (MVA) approach may use a structure tensor as a constraint. Example approaches may not require the manual picking of geological horizons in the depth image volumes and the residual moveouts in the migrated common image gathers. The structure tensor may be useful for estimating the local dip and azimuth information, which may be used as constraint for the calculation of Fréchet derivatives during tomographic inversion.

Aspects of the present disclosure may be understood in an illustrative context such as a marine seismic survey such as that shown in FIGS. 1-5, although this disclosure is not limited to marine surveys. At sea, seismic survey ships may deploy streamer behind the ship as shown in FIG. 1. Each streamer 110 may trail behind the ship 100 as the ship moves forward (in the direction of arrow 102), and each streamer includes multiple evenly-spaced receivers 114. Each streamer 110 may further include a programmable diverter 118 and programmable depth controllers that pull the streamer out to an operating offset distance from the ship's path (see FIG. 2) and down to a desired operating depth (FIG. 1).

Streamers 110 may be up to several kilometers long, and are usually constructed in sections 25 to 100 meters in length that include groups of up to 35 or more uniformly spaced receivers. Each streamer 110 may include electrical or fiber-optic cabling for interconnecting receivers 114 and the seismic equipment on ship 100. Data may be digitized near the receivers 114 and transmitted to the ship 100 through the cabling at rates of 7 (or more) million bits of data per second.

As shown in FIG. 1, seismic survey ship 100 can also tow one or more sources 112. Source 112 may be an impulse source or a vibratory source. The receivers 114 used in marine seismology are commonly referred to as hydrophones, and are usually constructed using a piezoelectric transducer. Various suitable types of hydrophones are available such as disk hydrophones and cylindrical hydrophones. Sources 112 and receivers 114 are typically deployed below the ocean's surface 104. Processing equipment, such an information handling systems, aboard the ship controls the operation of the sources and receivers and records the acquired data.

Seismic surveys may provide data for imaging below the ocean surface 104 to reveal subsurface structures such as structure 106, which lies below the ocean floor 108. Analysts employ seismic imaging methods to process the data and map the topography of the subsurface layers. Seismic survey data also reveals various other characteristics of the subsurface layers which can be used to determine the locations of oil and/or gas reservoirs.

To image the subsurface structure 106, source 112 may emit seismic waves 116 that are reflected where there are changes in acoustic impedance due to subsurface structure 106 (and other subsurface reflectors). The reflected waves are detected by a pattern of receivers 114. By recording (as a function of time) the arriving seismic waves 116 that have traveled from source 112 to subsurface structure 106 to receivers 114, an image of subsurface structure 106 can be obtained after appropriate data processing.

Figure 2:
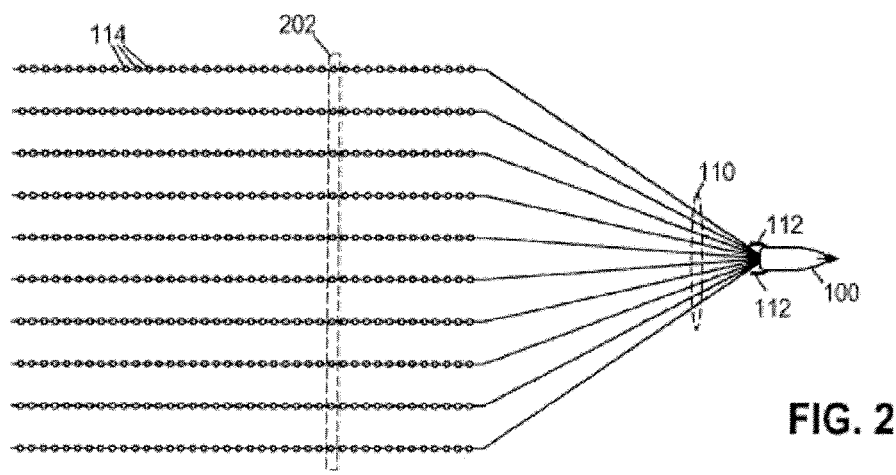
FIG. 2 is a diagram illustrating a top view of an illustrative marine seismic survey environment, according to aspects of the present disclosure.

FIG. 2 shows an overhead view (not to scale) of the seismic survey ship 100 towing a set of streamers 110 and two sources 112. As the ship 100 moves forward, the sources 112 can be triggered alternately in a so-called flip-flop pattern. Programmable diverters are used to provide roughly even spacing between the streamers. The receivers at a given position on the streamers are associated with a common field file trace number or common channel 202.

Figure 3:
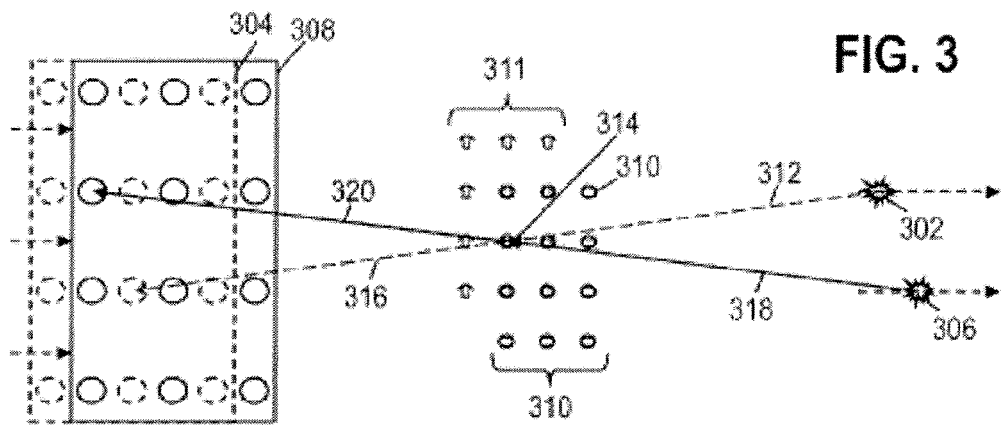
FIG. 3 is a diagram illustrating an illustrative midpoint pattern that result from flip-flop shots received by a given channel, according to aspects of the present disclosure.

FIG. 3 shows an overhead view of illustrative source and receiver positions for two shots. For a first shot, one source is triggered at position 302, and the illustrated portion of the receiver array is at position 304 (shown in broken outline). For a second shot, a source is triggered at position 306 and the illustrated portion of the receiver array is at position 308

(shown in solid outline). Assuming for the moment that the reflecting subsurface structures are horizontal, the seismic waves that reach each of the twelve receivers are reflected from a position underneath the midpoint between the source and receiver positions. Thus, the first shot produces reflections from beneath the twelve midpoints 311 (shown in broken outline with vertical crosshatching), while the second shot produces reflections from beneath the twelve midpoints 310 (shown in solid outline with horizontal crosshatching). As one example, vector 312 illustrates propagation of seismic energy from the shot 302 to a midpoint 314, and an equal length vector 316 shows the reflected seismic energy propagating to a receiver position. For the second shot 306, the vectors 318 and 320 show a similar propagation path. Note that midpoint 314 is one of the midpoints that is "hit" by multiple shots, thereby making more signal energy available from these areas when the information from the shots is processed and combined. Seismic surveys (for both land and sea) are generally designed to provide an evenly-distributed grid of midpoints with a fairly high average hit count for each midpoint.

Figure 4:
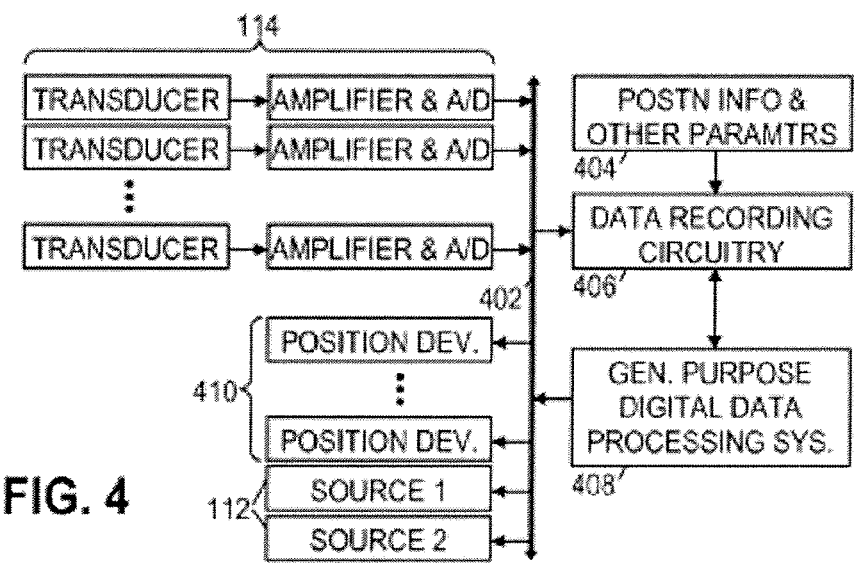
FIG. 4 is a diagram illustrating an illustrative seismic survey recording system, according to aspects of the present disclosure

FIG. 4 shows an illustrative seismic survey recording system having the receivers 114 coupled to a bus 402 to communicate digital signals to data recording circuitry 406 on survey ship 100. Position information and other parameter sensors 404 are also coupled to the data recording circuitry 406 to enable the data recording circuitry to store additional information useful for interpreting the recorded data. Illustratively, such additional information may include array orientation information and velocity information.

A general purpose digital data processing system 408, which may include an information handling system, is shown coupled to the data recording circuitry 406, and is further shown coupled via bus 402 to positioning devices 410 and seismic sources 112. Processing system 408 configures the operation of recording circuitry 406, positioning devices 410, and seismic sources 112. Recording circuitry 406 may acquire the high speed data stream(s) from receivers 114 onto a nonvolatile storage medium such as a storage array of optical or magnetic disks. Positioning devices 410 (including programmable diverters and depth controllers) may control the position of receivers 114 and sources 112.

The seismic recording system of FIG. 4 may include additional components not specifically shown here. For example, each streamer 110 could have an independent bus 402 for coupling to the data recording circuitry. Processing system 408 may include a user interface having a graphical display and a keyboard or other method of accepting user input, and may further include a network interface for communicating stored seismic survey data to a central computing facility having powerful computing resources for processing the seismic survey data.

Figure 5:
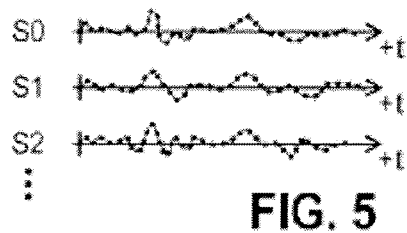
FIG. 5 is a diagram illustrating an illustrative set of traces, according to aspects of the present disclosure.

FIG. 5 depicts illustrative seismic signals, which may be referred to as traces, detected and sampled by receivers 114. The signals indicate some measure of seismic wave energy as a function of time (e.g., displacement, velocity, acceleration, pressure), and they are digitized at high resolution (e.g., 24 bits) at a programmable sampling rate. Such signals can be grouped in different ways, and when so grouped, they are called a "gather". For example, a "common midpoint gather" is the group of traces that have a midpoint within a defined region. A "shot gather" is the group of traces recorded for a single firing of the seismic source. A "multi-shot gather" is a group of shot gathers, often including all the traces recorded along a sail line in a marine seismic survey.

Figure 6:
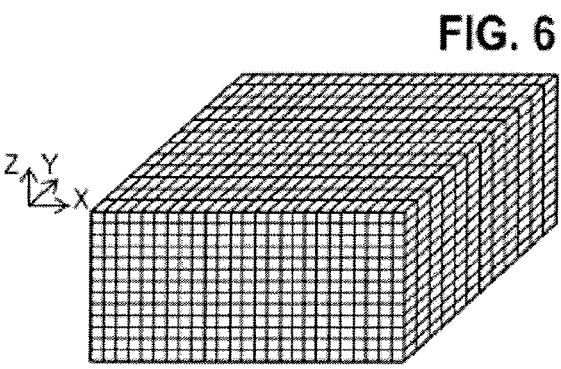
FIG. 6 is a diagram illustrating an illustrative data volume in three dimensions, according to aspects of the present disclosure.

Although it is possible to plot the various recorded waveforms in the format illustrated in FIG. 5 side by side in a plot that reveals large scale subsurface structures, such structures are distorted do not illustrate finer structures. In certain embodiments, the raw waveforms illustrated in FIG. 5 may be processed to create a depth image volume, i.e., a three dimensional array of data values such as that shown in FIG. 6. The depth image volume represents some seismic attribute throughout various depths and spatial orientations within the survey region. The three-dimensional array comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, and density. The volumetric data format more readily lends itself to computational analysis and visual rendering, and for this reason, the depth image volume may be termed a "three-dimensional image" of the survey region.

Figure 7:
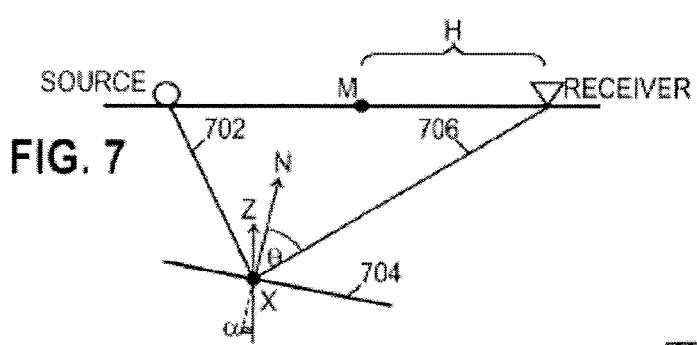
FIG. 7 is a diagram illustrating an illustrative shot geometry, according to aspects of the present disclosure.

FIG. 7 shows how various parameters relate to the geometry of an illustrative shot in two-dimensions (the 3D case is similar). Seismic energy propagates along ray 702 from a seismic source to a target interface 704 and reflects towards a receiver along ray 706. At the reflection point (represented elsewhere by an (x,y,z) coordinate and abbreviated here as a vector {right arrow over (x)}), the surface 704 has a normal vector {right arrow over (n)} at an angle α to the vertical. The incoming ray 702 and reflected ray 706 are at equal (but opposite) "opening" angles θ relative to the normal vector.

The seismic trace data initially gathered during a survey may be acquired as a function of shot location, receiver location, and time, i.e. P(s,r,t). Traditionally a change of variable is performed to place this data in the midpoint-offset-time domain, i.e., P(m,h,t), where midpoint m=(s+r)/2 and offset h=|s−r|/2. Observing that this data represents the wavefields observed at the surface (z=0), the wavefield equation is employed to extrapolate the subsurface wavefield, a process known as migration.

One example migration technique comprises the following equations:

$$P(m,h,t;z=0) \rightarrow P(m,h,w;z=0) \tag{1}$$

$$P(m,h,w;z=0) \rightarrow P(m,h,w;z) \tag{2}$$

$$P(m,h,w;z) \rightarrow P(m,p_h,\tau;z) \tag{3}$$

$$P(m,p_h,\tau;z) \rightarrow P(m,p_h,\tau=0;z) \tag{4}$$

Equation (1) represents a Fourier transform of the data set to place the data acquired at the surface (z=0) in the midpoint-offset-frequency domain. Equation (2) represents the migration of the data set using a well-known double square root (DSR) equation for extrapolating a wavefield. Equation (3) represents a Radon transform, which may also be referred to as a slant stack operation, of the data into the midpoint-p-tau domain. Offset ray parameters p and tau may represent slope and intercept of slant lines used to stack the data.

As indicated by equation (4), setting tau equal to zero provides a set of angle-domain common-image gathers, which can be viewed as a set of images P(m,z), each image being derived from seismic energy impacting the reflector at a different angle. The offset ray parameter $p_h$ is related to the local dip α and open angle θ by the equation:

$$p_h = 2 * S(m,z) * \cos \alpha * \sin \theta \tag{5}$$

where S(m,z) is the slowness (the inverse of acoustic velocity V(m,z)) in the neighborhood of the reflector.

Tomographic MVA may be used to determine and/or refine a velocity model based on depth mismatches in common image gathers. In the post-migrated angle domain, the seismic data $P(m,p_h,z)$ represent the depth positions of multiple images of the reflector location. Use of a correct velocity-depth model $V(m,z)$ in migration generates flat CAI gathers in the $p_h$–z domain (i.e., reflectors appear as events at a constant depth z, irrespective of $p_h$). Otherwise depth residuals are present on the CAI gathers, meaning that the event depth varies with $p_h$). To adapt depth residuals in the $p_h$–z domain to tomographic MVA approach, they are converted to travel time perturbations $\Delta t(p_h)$, which reflect the residual moveout of a specular raypath. Having chosen a reference depth, the depth residuals $\Delta z$ from the reference depth at the location of reflector can be determined using a semblance calculation between common images calculated at different angles in the angle-domain common image gathers. The conversion from depth residual to travel time perturbation in the in the $p_h$–z domain can be expressed as $$\Delta t(p_h) = \Delta z \sqrt{4S^2\cos^2\alpha - p_h^2} \qquad (6)$$

where S is the local slowness above the reflector perturbation and $\alpha$ is the local dip angle of the reflector. Equation (6) may calculates the travel time perturbation caused by the extra path length that a ray must travel due to the depth deviation. The dependence of travel time perturbation on the dip angle of reflector is mild for small dips but becomes significant at larger ones. Note that if the incident angle θ is desired it can be obtained without ray tracing using equation (5). As a result, the travel time perturbations calculated from CAI gathers are insensitive to raypath errors, allowing use of a faster ray tracing algorithm.

Existing tomographic MVA processing methods, including the tomographic MVA processing method, may require one or more steps in which values are manually selected by an engineer or technician. The step may include, for instance, horizon picking in the depth image volume for the estimation of local dip and azimuth information and residual moveout picking in the depth-migrated common image gathers for the measurement of depth residual information. Manual picking may be tedious and time-consuming, particularly in iterative processing and interpretation techniques in which new values are picked at every iteration.

According to aspects of the present disclosure, an automatic tomographic migration MVA approach may use a structure tensor as a constraint such that manual selection of geological horizons in the depth image volumes and residual moveouts in the migrated common image gathers may not be required. The structure tensor, for instance, may be useful for estimating the local dip and azimuth information, which may be used as constraint for the calculation of Fréchet derivatives during tomographic inversion.

Figure 8:
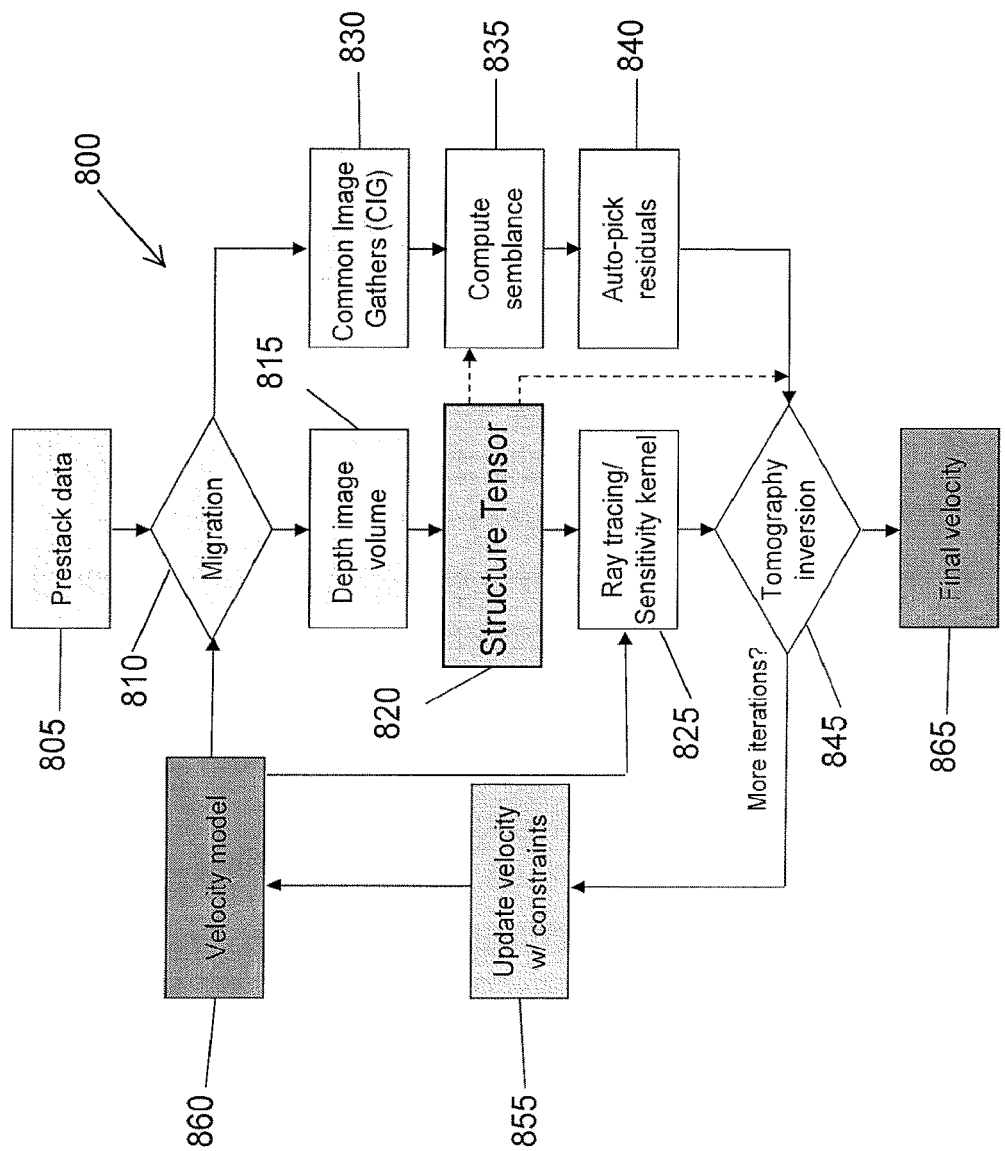
FIG. 8 is a flowchart illustrating a method for tomographic MVA, according to aspects of the present disclosure.

FIG. 8 is a flowchart illustrating a method for tomographic MVA 800, according to aspects of the present disclosure. The method may begin at step 805 in which seismographic traces in the form of pre-stack data is collected. Seismographic traces may be collect, for instance, using a seismic survey system similar to or different than the one described with reference to FIG. 1. Collecting seismographic traces may also comprise receiving at an information handling system or at a processor of an information handling system, previously collected seismographic traces from a medium on which the traces were previously stored. This may include, for instance, a memory device coupled to the processor, or a server within a central data repository. The previously saved traces may be received, for instance, over one or more wired or wireless communication channels.

At step 810, a depth migration may be performed based, at least in part, on a velocity model 860. The migration may, for instance, take the form of the example migration technique described above, but that migration technique is not intended to be limited, and may comprise other migration techniques that would be appreciated by one of ordinary skill in the art in view of this disclosure. In the first iteration of step 810, the velocity model 860 may comprise an initial velocity model. In subsequent iterations of step 810, the velocity model 860 may comprise an updated velocity model from step 855 (discussed below).

The depth migration at step 810 may be used to determine a depth image volume 815 and common image gathers 830. The depth image volume 815 may be the result of the depth migration at step 810 and may, but is not required to, take a form similar to the depth image volume described above with reference to FIG. 6. The common image gathers 830 may, but are not required to, comprise angle-domain common image gathers determined using the process described above. Other types of common image gathers are possible, as would be appreciated by one of ordinary skill in the art in view of this disclosure.

Figure 9:
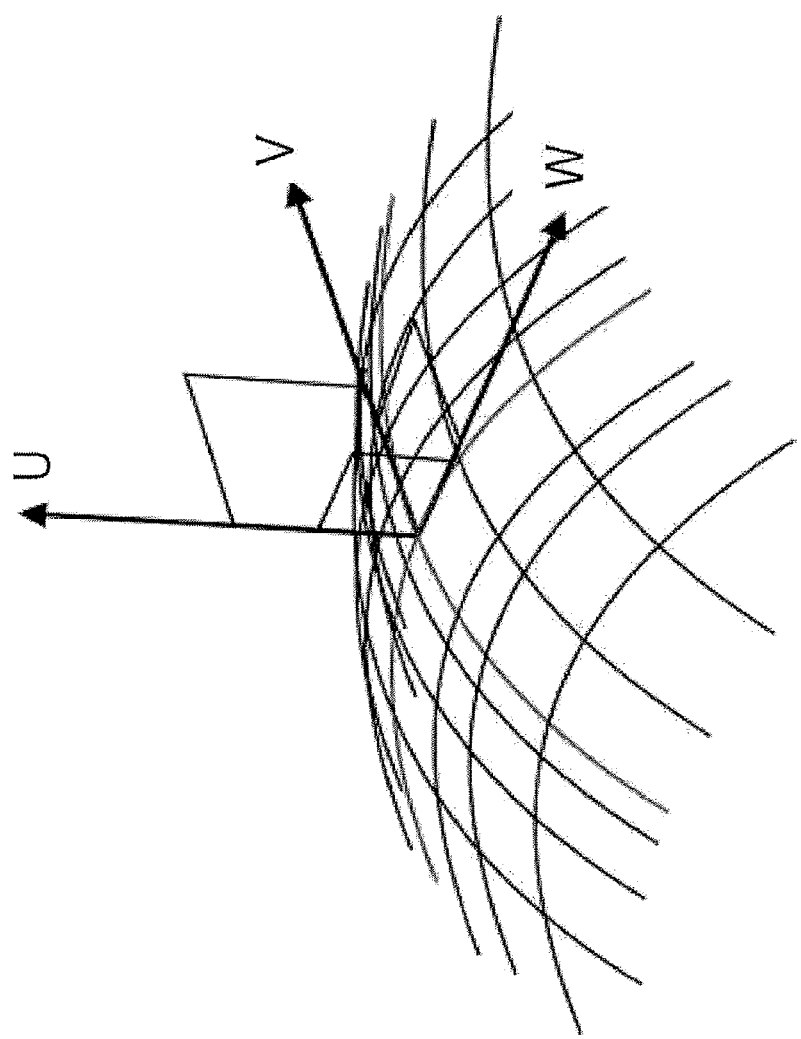
FIG. 9 is a diagram illustrating eigenvectors in a structure tensor, according to aspects of the present disclosure.

At step 820, a structure tensor may be computed from the depth image volume 815 to estimate a structural dip and azimuth information of the depth image volume 815. In certain embodiments, the structure tensor computation may, but is not require to, compute smoothed Gaussian derivatives everywhere in the depth image volume 815, and then the eigen-decomposition may be determined using the following equation $$S = \lambda_u u u^T + \lambda_v v v^T + \lambda_w w w^T \qquad (7)$$

where, $\alpha \leq \lambda_w \leq \lambda_v \leq \lambda_u$. FIG. 9 is a diagram illustrating eigenvectors in a structure tensor, according to aspects of the present disclosure. As shown in FIG. 9, the eigenvectors may define a binomial coordinate system tangent to image gradients. The structure tensor computation may output 12 volumes of eigenvectors (three Cartesian components each) and eigenvalues. The dip attribute volumes may be computed from the tangent normal U; the dip magnitude may be the Euclidean sum of the two lateral Cartesian components; and the azimuth may be the arctangent of those components.

Figure 10:
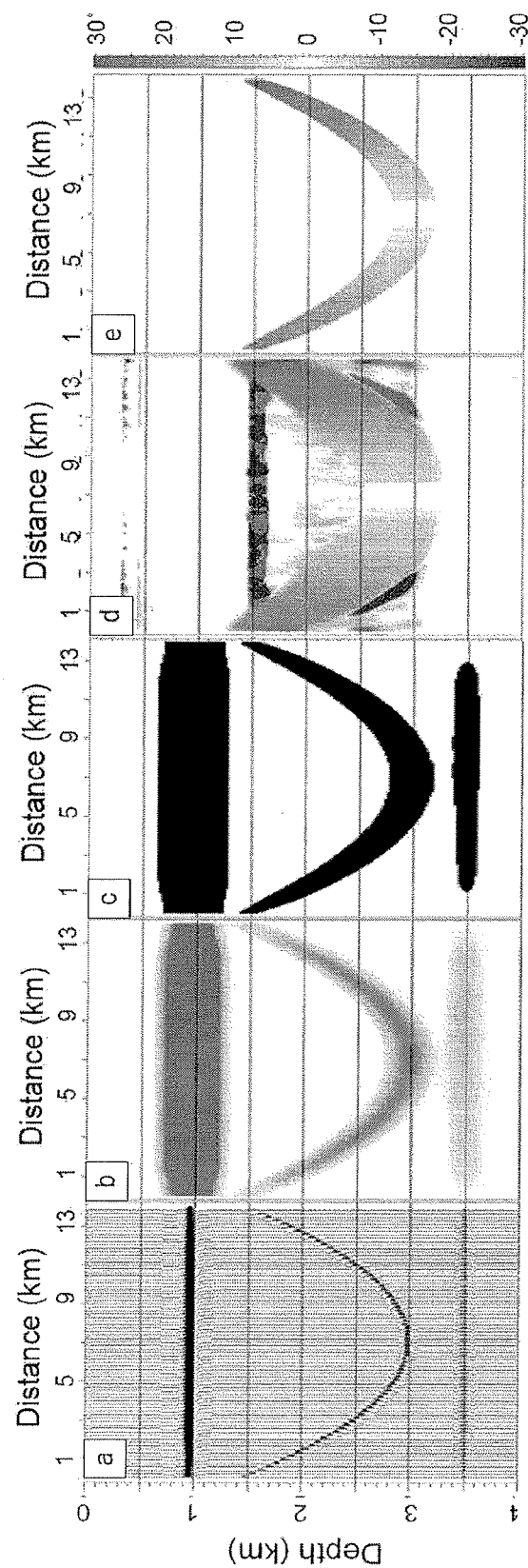
FIGS. 10a-e are diagrams illustrating obtaining structure information from a migrated image, according to aspects of the present disclosure.

Returning to FIG. 8, at step 835, semblance may be computed for the common image gathers 830, with the structure tensor of step 120 and the computed dip attributes used as a constraint. In certain embodiments, the structure tensor components may also be used to mask regions of weak signal or conflicting dip. Although a number of structure-oriented semblance and planarity attributes may be used for eigenvalue ratios, in practice, a mask of threshold $\lambda_u$ may be adequate. To illustrate, FIGS. 10a-e depict a process for obtaining structure information from a migrated image, according to aspects of the present disclosure. Dip extraction may computed for a simple synthetic syncline 1000. As depicted, FIG. 10a may comprise a cross-section through the middle of a depth image of the syncline 1000. Structure tensors may be constructed from a reverse time migrated image of FIG. 10a. FIG. 10b shows the $\lambda_u$ attribute, the eigenvalue in the tangent-normal direction, which may be one of the structure tensor components related with amplitude and coherency. FIG. 10c shows a thresholded $\lambda_u$ mask profile, which may be created using FIG. 10b. The mask profile of FIG. 10c may be created to eliminate low amplitude, non-coherent noise. FIG. 10d shows the raw Cartesian component of $U_{inline}$, and FIG. 10e shows the masked $U_{inline}$. FIGS. 10d and 10e thus respectively illustrate inline dip angles calculated from structure tensors before and after applying the mask profiles of FIG. 10c.

Figure 11:
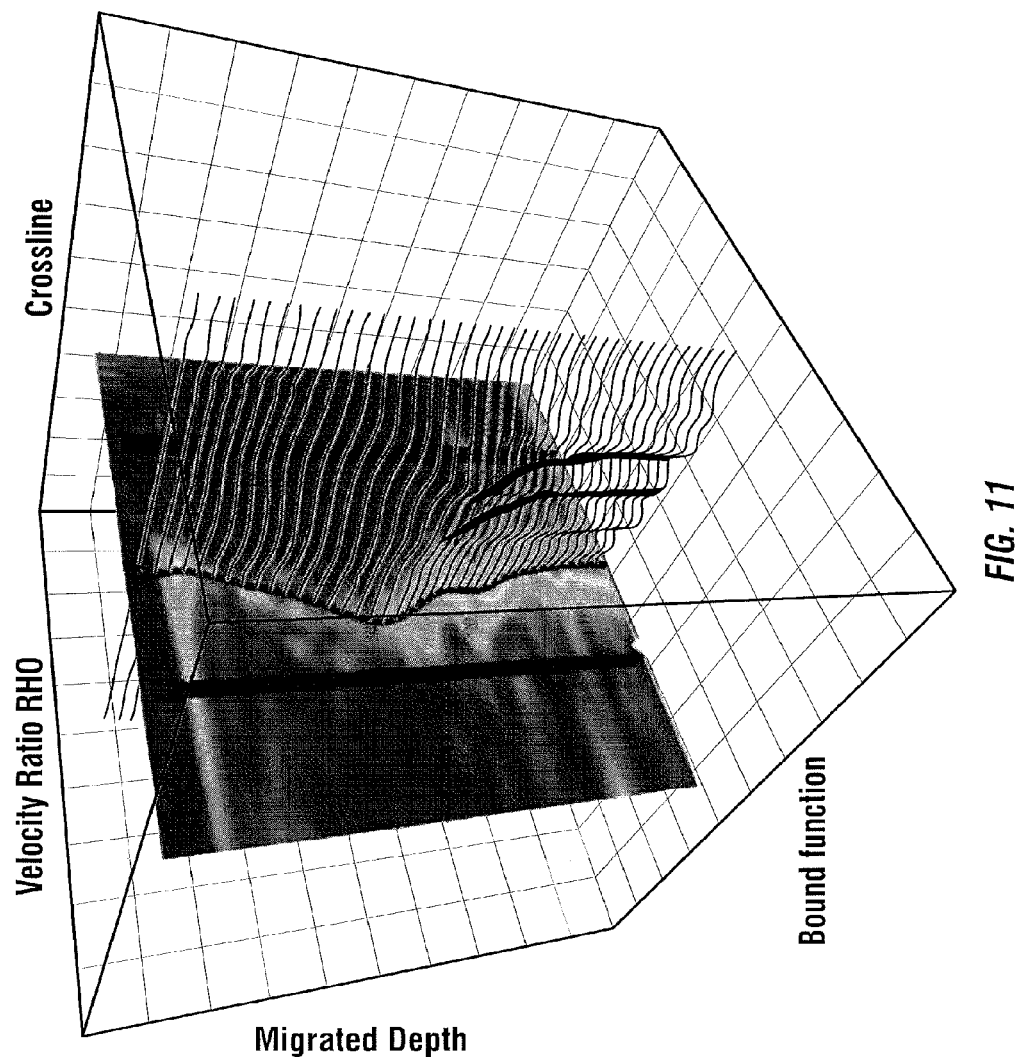
FIG. 11 are diagrams illustrating the result of automatically picked depth residuals, according to aspects of the present disclosure.

Returning to FIG. 8, at step 840, depth residuals may be automatically picked on the residual semblances from step 835. In certain embodiments, an automatic picking algorithm may be used that picks functions to maximize the summation through the semblance values in multiple directions simultaneously based on an input guide function and a positive and negative search range relative to the input guide. For residual moveouts after migration, the input guide may be zero moveout. The picked moveout may be constrained to be smooth in the vertical and all spatial directions to avoid noisy picks. The simultaneous automatic picking of all points together by means of global optimization also may avoid wild picks. FIG. 11 illustrates the result of automatically picked depth residuals, according to aspects of the present disclosure. As shown in FIG. 11, the pick result may be a velocity "hyper-plane" (of which FIG. 11 depicts the projection of a single line).

In this way, computation may be fully automated and eliminate the need for manual dip and horizon picking at any stage. Control may be exercised over this computation by adjusting parameters such as the smoothing in the tensor computation and the type of masking used.

At step 825, ray tracing and/or sensitivity kernel computations may be performed using the structure tensor of step 820 as a constraint. In certain embodiments, ray paths may be calculated using a dynamic ray tracing algorithm. Given local reflection and azimuth angles, a pair of incident/reflected rays may be shot starting from the reflection point. When the two rays reach the surface, the source and receiver locations may be determined, and the source-receiver offset and shooting azimuth at the surface may be obtained. Such ray tracing allows for straightforward handling of migrated angle gathers. To handle migrated offset gathers, for each reflection point, the appropriate reflection angle and local azimuth angle may be determined to match the expected surface offset and shooting azimuth until any mismatches are minimized within given tolerances. According to aspects of the present disclosure, FIG. 12a illustrates an exemplary inline dip angle overlaid on a reverse-time migrated image, and FIG. 12b illustrates exemplary ray paths overlaid on a velocity model.

Returning to FIG. 8, at step 845, tomographic inversion may be performed with the ray tracing of step 825 and the automatically picked depth residuals of step 840. In certain embodiments, the inversion may be conducted using the following equation:

$$\frac{v(r_1)}{2\cos\alpha}\left[\frac{L(h)}{\cos\gamma} - L(h=0)\right] \cdot \Delta s = \Delta z(h) \quad (8)$$

where, $$\left[\frac{L(h)}{\cos\gamma} - L(h=0)\right]$$

is a term reflecting the ray tracing of step 825, $\Delta s$ is a term reflecting updated slowness perturbation, and $\Delta z(h)$ is a term reflecting the automatically picked depth residuals of step 840. In this embodiment, the calculated rays or sensitivity kernels may be stored as a sparse Jacobian matrix and the inversion system may be solved using the conjugate-gradient method. In this way, an updated velocity model may be obtained.

If the velocity model generated at step 845 is the final velocity model, it may be output from the system at step 865. Alternatively, if additional iterations of the tomographic MVA are desired to further update the velocity model, the velocity model 860 generated at step 845 may be provided at step 855 for use as the new velocity model in future iterations (beginning at step 810 with depth migration).

The advantages of the tomographic MVA method described in the present disclosure may be seen with reference to its application to an exemplary 3D SEG Advanced Modeling Corporation (SEAM) dataset. First, an initial stack image may be obtained by depth migration using an initial velocity model. Then, with the computation of structure tensors of the initial stack image, the dip and azimuth may be obtained. In the ray tracing procedure, the dip and azimuth information, which combine the constraints from the structure tensor, may be input. Based on the result of the auto-picked depth residual and accurate ray tracing, the updated velocity may be determined.

Figure 13B:
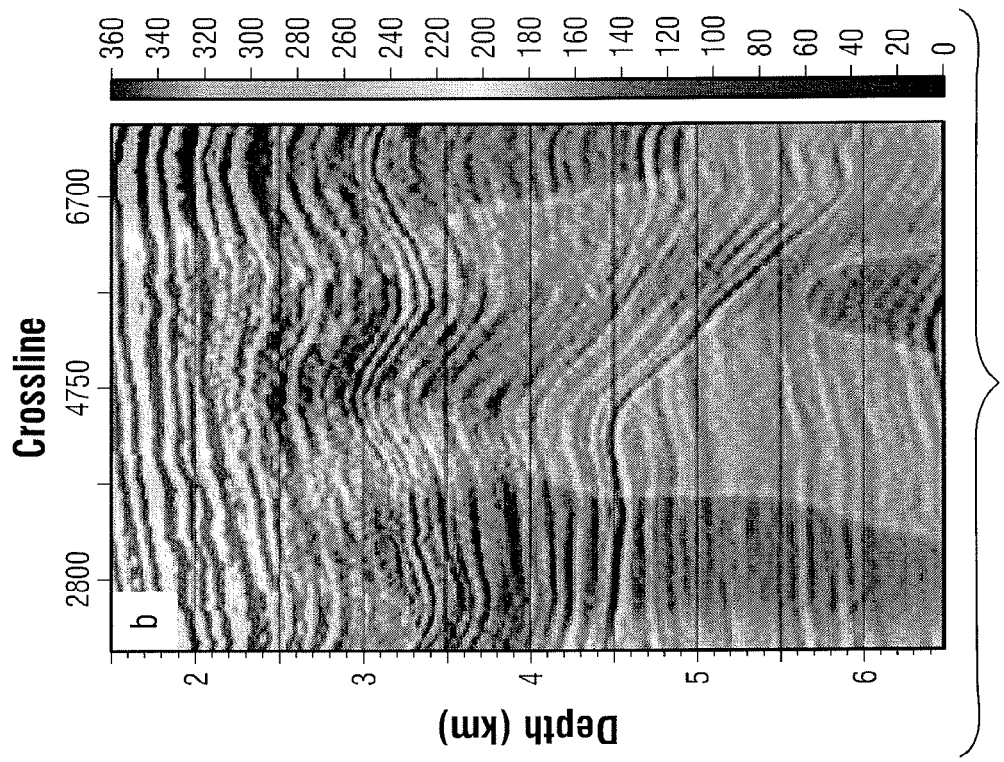
FIGS. 13a-b are diagrams illustrating the dip and azimuth from the structure tensor of an exemplary SEAM dataset, according to aspects of the present disclosure.
Figure 13A:
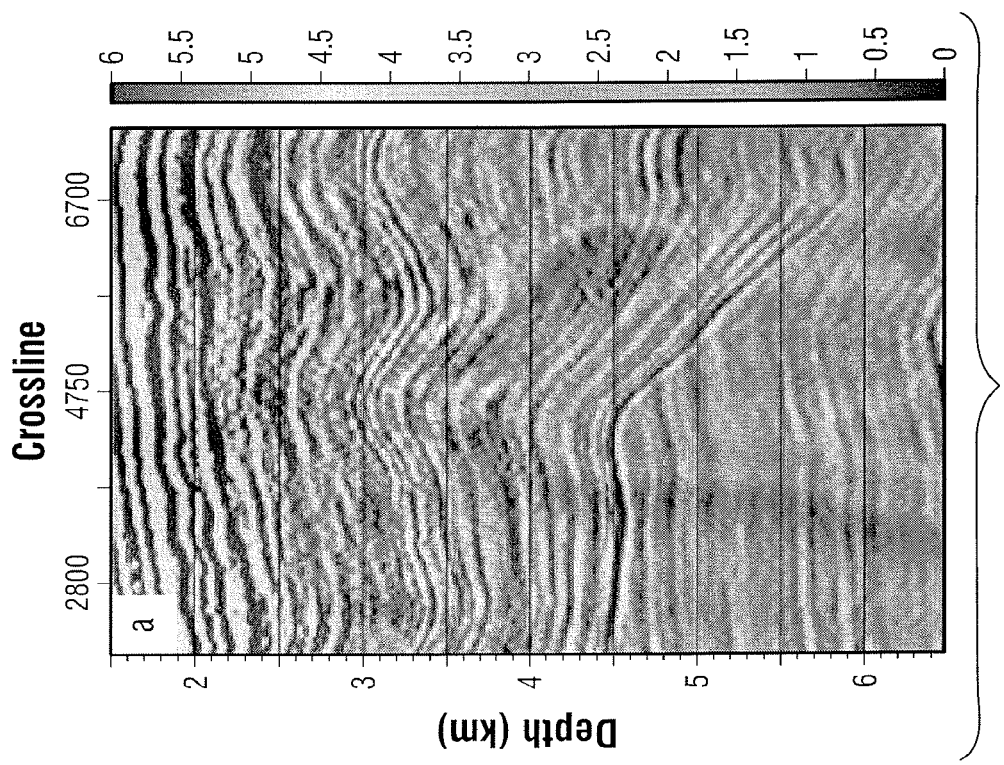

FIGS. 13a-b illustrate the dip and azimuth from the structure tensor of the exemplary SEAM dataset, according to aspects of the present disclosure. FIGS. 13a and 13b respectively show the dip and azimuth results from the structure tensor of the initial image volume. As seen in FIGS. 13a-b, the results from the structure tensor may be more accurate compared with ray tracing result with a zero dip-azimuth assumption.

FIGS. 14a-b illustrate a comparison of ray density coverage in a depth slice on the surface from the exemplary SEAM dataset, according to aspects of the present disclosure. Specifically, FIG. 14a shows ray density coverage in a depth slice on the surface with the structure tensor constraint, and FIG. 14b shows ray density coverage without the structure tensor constraint. The improved ray coverage by use of the structure tensor constraint may be observed in FIG. 14a compared to FIG. 14b.

Figure 15A:
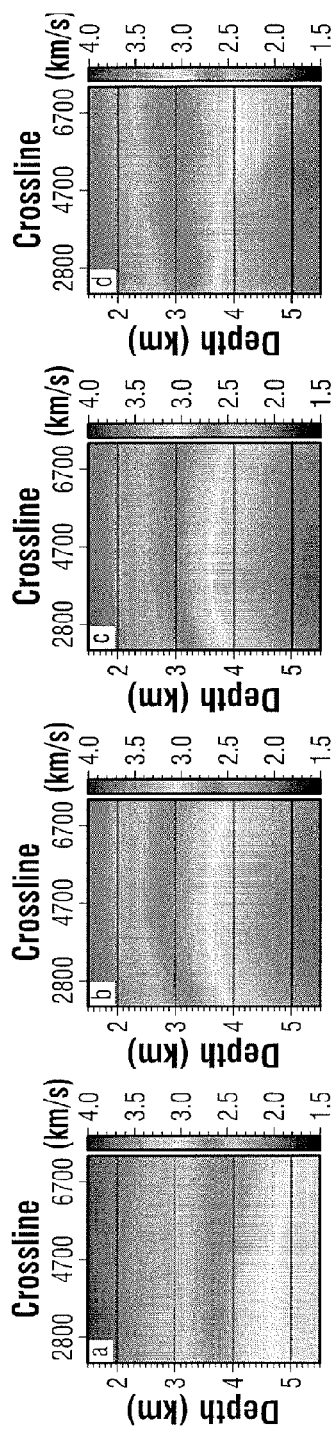
FIGS. 15a-j are diagrams illustrating updated velocity, image, and gather comparisons from an exemplary SEAM dataset, according to aspects of the present disclosure.
Figure 15B:
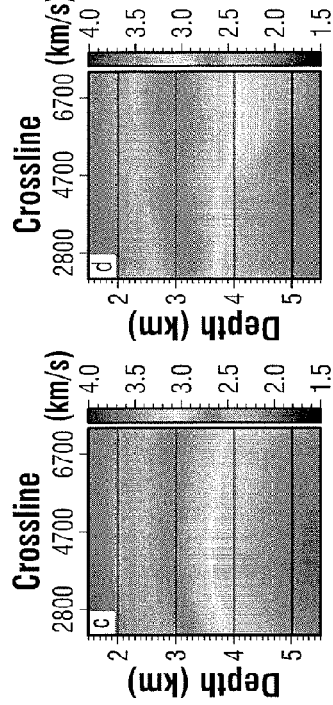
Figure 15C:
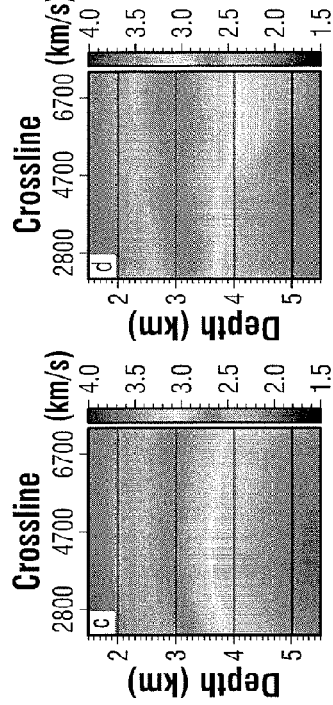
Figure 15D:
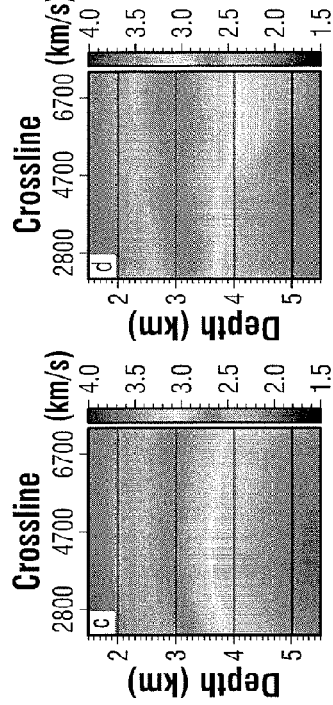

FIGS. 15a-j illustrate updated velocity, image, and gather comparisons from the exemplary SEAM dataset, according to aspects of the present disclosure. Specifically, FIG. 15a shows an initial velocity; FIG. 15b shows an updated velocity after a first iteration of tomographic MVA without a structure tensor constraint; FIG. 15c shows an updated velocity after first iteration of tomographic MVA with a structure tensor constraint; and FIG. 15d shows the true velocity of the exemplary SEAM dataset. As illustrated, the updated velocity with the structure tensor constraint (FIG. 15c) is closer to the true velocity (FIG. 15d) after the first iteration compared with the updated velocity without the constraint (FIG. 15b).

Figure 15E:
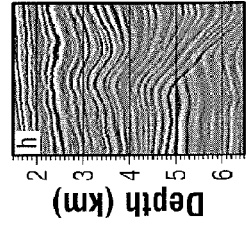
Figure 15F:
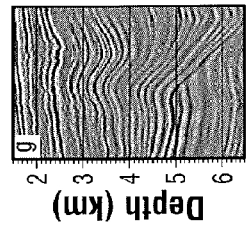
Figure 15G:
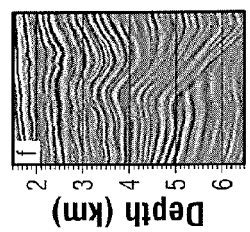
Figure 15H:
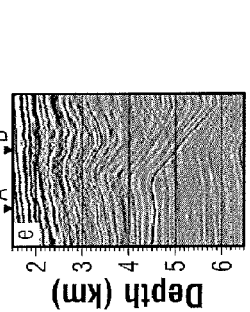

The improved accuracy is further evident in comparing among the stack image (FIGS. 15e-h). Specifically, FIG. 15e shows an image of the default initial velocity; FIG. 15f shows an image using updated velocity after a first iteration without a structure tensor constraint; FIG. 15g shows an image using updated velocity after first iteration with a structure tensor constraint; and FIG. 15h shows an image of the true velocity of the exemplary SEAM dataset. As illustrated, the updated velocity image with the structure tensor constraint (FIG. 15g) is closer to the true velocity (FIG. 15h) after the first iteration compared with the updated velocity without the constraint (FIG. 15f).

Figure 15I:
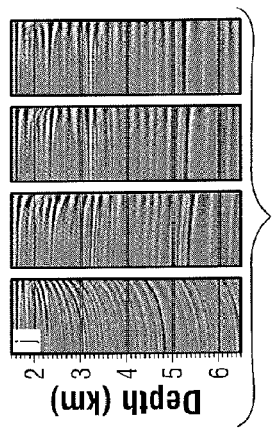
Figure 15J:
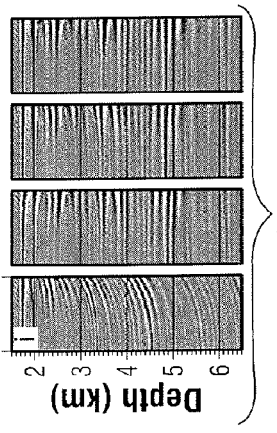

The improved accuracy is further evident in two exemplary sets of common image gather data (FIG. 15i and FIG. 15j). FIG. 15i shows four panels of offset image gathers at the location A in FIG. 15e. From left to right, the four panels in FIG. 15i show offset image gather with default initial velocity, updated velocity without a structure tensor constraint, updated velocity with a structure tensor constraint, and true velocity of the dataset. FIG. 15j shows four similar panels for offset image gathers at the location B in FIG. 15e. As illustrated in both sets of exemplary image gather data, the updated velocity with a structure tensor constraint is closer to the true velocity than the updated velocity without a structure tensor constraint.

Figure 16:
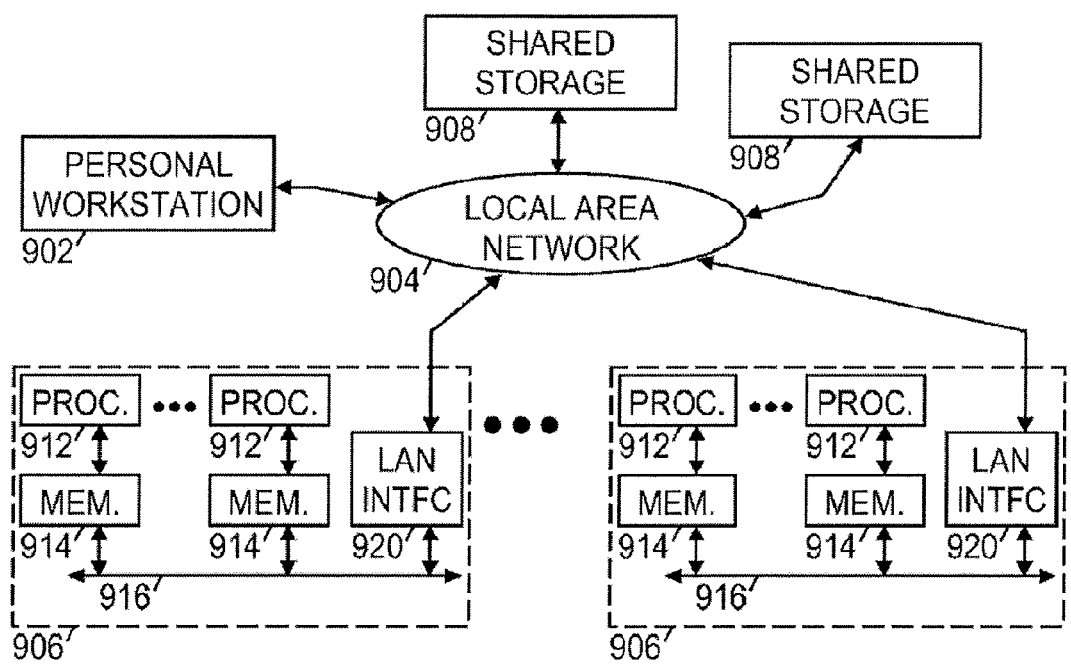
FIG. 16 is a diagram illustrating an illustrative imaging system, according to aspects of the present disclosure.

Some or all of the steps of the illustrative method described above with respect to FIG. 8 may comprise software steps performed in an information handling system. Software may be characterized by a set of instructions stored in a computer readable medium that, when executed by a processor, cause the processor to perform certain functions. FIG. 16 shows an illustrative computer system 900 in which the illustrative method may be performed. As depicted, a personal workstation 902 is coupled via a local area network (LAN) 904 to one or more multi-processor computers 906, which are in turn coupled via the LAN to one or more shared storage units 908. The workstation 902 and computers 906 may comprise information handling systems. Personal workstation 902 serves as a user interface to the processing system, enabling a user to load survey data into the system, to retrieve and view image data from the system, and to configure and monitor the operation of the processing system. Personal workstation 902 may take the form of a desktop computer with a graphical display that graphically shows survey data and 3D images of the survey region, and with a keyboard that enables the user to move files and execute processing software.

LAN 904 provides high-speed communication between multi-processor computers 906 and with personal workstation 902. The LAN 904 may take the fond of an Ethernet network.

Multi-processor computer(s) 906 provide parallel processing capability to enable suitably prompt conversion of seismic trace signals into a survey region image. Each computer 906 includes multiple processors 912, distributed memory 914, an internal bus 916, and a LAN interface 920. Each processor 912 operates on an allocated portion of the input data to produce a partial image of the seismic survey region. Associated with each processor 912 is a distributed memory module 914 that stores conversion software and a working data set for the processor's use. Internal bus 916 provides inter-processor communication and communication to the LAN networks via interface 920. Communication between processors in different computers 906 can be provided by LAN 904.

Shared storage units 908 may be large, stand-alone information storage units that employ magnetic disk media for nonvolatile data storage. To improve data access speed and reliability, the shared storage units 908 may be configured as a redundant disk array. Shared storage units 908 initially store a initial velocity data volume and shot gathers from a seismic survey. In response to a request from the workstation 902, the image volume data can be retrieved by computers 906 and supplied to workstation for conversion to a graphical image to be displayed to a user.

An example method for tomographic migration velocity analysis may include collecting seismographic traces from a subterranean formation and using an initial velocity model to generate common image gathers and a depth image volume based, at least in part, on the seismographic traces. A structure tensor may be computed with the depth image volume for automated structural dip and azimuth estimation. A semblance may be generated using said plurality of common image gathers and said structure tensor. Image depth residuals may be automatically picked from said semblance. A ray tracing computation may be performed on said initial velocity models using said structure tensor. An updated velocity model may be generated with a tomographic inversion computation, wherein said tomographic inversion computation uses said plurality of image depth residuals and said ray tracing computation.

In certain embodiments described in the preceding paragraph, collecting seismographic traces comprises emitting at least one seismic wave, and receiving a reflection of the at least one seismic wave. In certain embodiments described in the preceding paragraph, using the initial velocity model to generate the plurality of common image gathers and the depth image volume based, at least in part, on the seismographic traces comprises performing a depth migration on the seismographic traces. In certain embodiments described in the preceding paragraph, generating the semblance using said plurality of common image gathers and said structure tensor comprises generating the semblance using the structure tensor as a constraint.

In certain embodiments described in the preceding paragraph, automatically picking a plurality of image depth residuals from said semblance comprises automatically picking a plurality of image depth residuals using an automatic picking algorithm that maximizes the semblance values in multiple directions based on an input guide function and a positive and negative search range relative to the input guide.

In certain embodiments described in the preceding paragraph, computing the structure tensor using said depth image volume for automated structural dip and azimuth estimation comprises computing smoothed Gaussian derivatives in the depth image volume.

In certain embodiments described in the preceding three paragraphs, the method may further comprise using the updated velocity model to generate an updated plurality of common image gathers and an updated depth image volume.

In certain embodiments described in the preceding paragraph, the method may further comprise computing an updated structure tensor using said updated depth image volume for automated updated structural dip and updated azimuth estimation; generating an updated semblance using said plurality of updated common image gathers and said updated structure tensor; automatically picking a plurality of updated image depth residuals from said updated semblance; performing a ray tracing computation on said updated velocity model using said updated structure tensor; and generating a second updated velocity model with the tomographic inversion computation.

In certain embodiments described in the preceding five paragraphs, the method may further comprise determining one or more characteristics of the formation based, at least in part, on the updated velocity model.

In certain embodiments described in the preceding paragraph, the one or more characteristics of the formation comprise strata boundaries of the formation.

An example system may comprise a seismic survey system with at least one seismic source and at least one seismic sensor, and an information handling system comprising a processor and a memory device coupled to the processor. The memory device may contain a set of instructions that, when executed by the processor, causes the processor to collect seismographic traces from a subterranean formation, and use an initial velocity model to generate a plurality of common image gathers and a depth image volume based, at least in part, on the seismographic traces. The set of instructions may further cause the processor to compute a structure tensor using said depth image volume for automated structural dip and azimuth estimation, and generate a semblance using said plurality of common image gathers and said structure tensor. The set of instructions may further cause the processor to automatically pick a plurality of image depth residuals from said semblance; perform a ray tracing computation on said initial velocity models using said structure tensor; and generate an updated velocity model with a tomographic inversion computation, wherein said tomographic inversion computation uses said plurality of image depth residuals and said ray tracing computation.

In certain embodiments described in the preceding paragraph, the seismographic traces comprise at least one seismic wave received at the at least one seismic sensor, wherein the at least one seismic wave was generated by the at least one seismic source and reflected off of a subterranean formation. In certain embodiments described in the preceding paragraph, the set of instructions that cause the processor to use the initial velocity model to generate the plurality of common image gathers and the depth image volume based, at least in part, on the seismographic traces further causes the processor to perform a depth migration on the seismographic traces.

In certain embodiments described in the preceding paragraph, the set of instructions that cause the processor to compute the structure tensor using said depth image volume for automated structural dip and azimuth estimation further causes the processor to compute smoothed Gaussian derivatives in the depth image volume.

In certain embodiments described in the preceding three paragraphs, the set of instructions that cause the processor to generate the semblance using said plurality of common image gathers and said structure tensor further causes the processor to generate the semblance using the structure tensor as a constraint. In certain embodiments described in the preceding three paragraphs, the set of instructions that cause the processor to automatically pick a plurality of image depth residuals from said semblance further causes the processor to automatically pick the plurality of image depth residuals using an automatic picking algorithm that maximizes the semblance values in multiple directions based on an input guide function and a positive and negative search range relative to the input guide. In certain embodiments described in the preceding three paragraphs, the set of instructions further cause the processor to use the updated velocity model to generate an updated plurality of common image gathers and an updated depth image volume.

In certain embodiments described in the preceding paragraph, the set of instructions further cause the processor to compute an updated structure tensor using said updated depth image volume for automated updated structural dip and updated azimuth estimation; generate an updated semblance using said plurality of updated common image gathers and said updated structure tensor; automatically pick a plurality of updated image depth residuals from said updated semblance; perform a ray tracing computation on said updated velocity model using said updated structure tensor; and generate a second updated velocity model with the tomographic inversion computation.

In certain embodiments described in the preceding five paragraphs, the set of instructions further cause the processor to determine one or more characteristics of the formation based, at least in part, on the updated velocity model.

In certain embodiments described in the preceding paragraph, the one or more characteristics of the formation comprise strata boundaries of the formation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for tomographic migration velocity analysis, comprising:
    collecting seismographic traces from a subterranean formation;
    using an initial velocity model to generate a plurality of common image gathers and a depth image volume based, at least in part, on the seismographic traces;
    computing a structure tensor using said depth image volume for automated structural dip and azimuth estimation, wherein computing the structure tensor using said depth image volume for automated structural dip and azimuth estimation comprises computing smoothed Gaussian derivatives in said depth image volume;
    generating a semblance using said plurality of common image gathers and said structure tensor;
    automatically picking a plurality of image depth residuals from said semblance;
    performing a ray tracing computation on said initial velocity models using said structure tensor;
    generating an updated velocity model with a tomographic inversion computation, wherein said tomographic inversion computation uses said plurality of image depth residuals and said ray tracing computation that is based on the initial velocity model;
    displaying a mapping of a topography of the subterranean formation based on an updated velocity image, wherein the updated velocity image is based on the updated velocity model; and
    determining a location of a reservoir based on the mapping.

2. The method of claim 1, wherein collecting seismographic traces comprises emitting at least one seismic wave, and receiving a reflection of the at least one seismic wave.

3. The method of claim 1, wherein using the initial velocity model to generate the plurality of common image gathers and the depth image volume based, at least in part, on the seismographic traces comprises performing a depth migration on the seismographic traces.

4. The method of claim 1, wherein generating the semblance using said plurality of common image gathers and said structure tensor comprises generating the semblance using the structure tensor as a constraint.

5. The method of claim 1, wherein automatically picking a plurality of image depth residuals from said semblance comprises automatically picking a plurality of image depth residuals using an automatic picking algorithm that maximizes the semblance values in multiple directions based on an input guide function and a positive and negative search range relative to the input guide.

6. The method of claim 1, further comprising using the updated velocity model to generate an updated plurality of common image gathers and an updated depth image volume.

7. The method of claim 6, further comprising
- computing an updated structure tensor using said updated depth image volume for automated updated structural dip and updated azimuth estimation;
- generating an updated semblance using said plurality of updated common image gathers and said updated structure tensor;
- automatically picking a plurality of updated image depth residuals from said updated semblance;
- performing a ray tracing computation on said updated velocity model using said updated structure tensor; and
- generating a second updated velocity model with the tomographic inversion computation.

8. The method of claim 1, further comprising determining one or more characteristics of the formation based, at least in part, on the updated velocity model.

9. The method of claim 8, wherein the one or more characteristics of the formation comprise strata boundaries of the formation.

* * * * *